3,275,721
METHOD OF CASTING AND FIRING A LAYERED CERAMIC ARTICLE
Pierre Leroy, Saint-Germain-en-Laye, and Roger Simon, Boutheon, France, assignors to Compagnie des Ateliers et Forges de la Loire (St. Chamond-Firminy-St. Etienne-Jacob-Holtzer), Paris, France
No Drawing. Filed Oct. 18, 1965, Ser. No. 497,446
Claims priority, application France, Apr. 18, 1962, 894,916, Patent 1,344,240
6 Claims. (Cl. 264—60)

This is a continuation-in-part application of copending application Serial No. 272,515, filed April 12, 1963.

This invention relates to improved refractory compositions, more especially porous refractory compositions, and to methods of making them.

In the fields of metallurgy and other engineering arts involving the use of high temperatures, it is advantageous to have available porous compositions capable of withstanding elevated temperatures. For example, in certain metallurgical processes it is desirable to discharge a blast of oxygen or other gas through a porous refractory wall into a bath of molten metal to react with the metal in the bath. Considerable difficulties have been encountered in the art in providing a wholly satisfactory porous refractory material that would also possess good mechanical strength and cohesion at the necessary high temperatures. Thus, in the particular application just mentioned, it has been found that the conventional porous refractory elements in direct contact with the high-temperature molten metal do not stand up well in service but require frequent replacement.

It is a broad object of this invention to provide a process for producing novel refractory compositions of porous consistency, having improved high-temperature cohesion and strength characteristics over those currently available.

In a porous refractory material, the cohesion between adjacent particles is obviously lower than in a compact material of comparable composition, since the particles are less closely-knitted in the former than in the latter. To make up for this deficiency, it would be necessary to establish stronger ceramic bonds between the constituents in order to maintain an acceptable value for the over-all mechanical strength of the material. However, in any refractory composition, whether compact or porous in character, conflict is found to exist in practice, as between the attainment of a high ceramic, i.e. sintered, bond, and high refractory characteristics.

That is, where the composition of the material is such that the particles thereof will sinter at comparatively low temperatures, a uniform sintered bond even at the center or heart of the refactory element is easily obtained during the firing step; however, the refractoriness of the resulting product will be comparatively low. If on the other hand the composition used is so formulated that the formation of the ceramic bond between constituents requires a high sintering temperature, it is very difficult to ensure during firing that all of the particles are effectively sintered throughout the volume of the part being fired. To the extent however, that such uniform sintering could actually be achieved, the refractoriness of the resulting element would be of a very high order. This practical difficulty becomes especially acute in connection with porous refractory materials, for the reasons indicated above, and has heretofore limited the usefulness of the porous refractories available on the market.

It is an object of this invention to overcome the stated difficulties and to provide improved refractory compositions, including especially porous refractories, having high cohesion and mechanical strength characteristics both at ordinary and at high temperatures. More specifically, it is an object to provide a refractory composition having inherently a high sintering temperature, and hence a correspondingly high refractoriness in the fired product, while simultaneously ensuring the effective attainment of the sintering temperature throughout the part during firing. More specifically still, an object of the invention is to provide a refractory composition which, on firing, will be involved in an exothermic reaction between certain of its constituents, effective to create hot points uniformly distributed throughout the body of the element being fired, and thereby ensure that all the particles thereof are effectively sintered and ceramically bonded into a strong, unitary yet porous mass.

The aforementioned object is accomplished by first mixing an aggregate of high-melting sinterable constituents, substantially free of fines (that is, free of granulometric fractions less than about 0.3 mm., preferably about 0.5 mm., in size), with a refractory binder constituent capable of imparting adequate cohesion to the mixture at relatively low temperatures until the subsequent firing has been performed, and an oxidizable metal powder constituent. A second, compact mix, is prepared by mixing an aggregate of refractory material, the particle size of at least 20%, and preferably 30% by weight of said material being less than 0.2 mm., with a hydraulic ceramic binder, known per se, which maintains the particles of the mix in a coherent state. The amount of refractory material in the compact mix is not critical and can range from 30% to 90% of the total weight of the compact mix.

The particular amount of the various components of the porous mix is not critical; however, preferably, the aggregate material can be between 40%–80%, based on the total weight of the porous mix. The amount of binder is not critical and can be between 10% and 40% whereas the oxidizable metal can be between 0.5% and 10%. Sufficient water is added to provide a highly homogeneous pulp, for example, between 5% to 25% of the porous mix can be water.

The compact mix is poured into a mold which mold is provided with a liner. The compact mix is then poured into the space between the mold wall and the liner in such a manner as to provide a compact casing on at least three sides of the porous mix. The two mixes are allowed to remain at ordinary or moderate temperature for a time sufficient to cause the binder to set and impart cohesion to the molding. The resulting porous molded element having compact walls is removed from the mold, and is placed in a furnace and is there heated to a suitable firing temperature while blowing oxidizing gas through orifices in one of the compact walls and hence to the porous element, thereby oxidizing the metal powder constituent within the element. The heat evolved by the exothermic oxidation reaction of each metal powder particle throughout the volume of the porous element ensures that all portions of the element are subjected to a high sintering temperature conducive to the production of a strong, ceramic, sintered bond between the elements of the aggregate in said porous section.

Preferably, the oxidizable metal powder constituent is so selected that the resulting oxide formed within the interstices between the grains of the aggregate will have a high melting point so that it will not, itself, undergo any substantial amount of fusing and liquid phase sintering, but that the heat generated by the formation of said oxide will cause a substantial amount of surface sintering between the grains of the aggregate. It is this surface sintering between the particles of the aggregate constituent of the mix which is responsible for the formation of the highly refractory ceramic bonds in the final product. Examples of powder metals fulfilling the requisite conditions of high oxide melting point and high heat of oxide formation, include zirconium, aluminum, chromium. The powder constituent used in the mix may include more than one metal, and may have a proportion of oxide incorporated therein.

In a desirable modified form of the invention, the oxidizable powder constituent used is selected so that the oxide formed on oxidation thereof in the furnace within the interstices between the grains of the sinterable aggregate will serve as a flux, combining with the constituents of the aggregate to lower the melting point thereof, and thereby cause substantial sintering in the liquid phase.

Examples of oxidizable powder constituents suitable for this purpose include powder iron and powder ferrosilicon.

In a further modified aspect of the invention, the porous mix comprises an aggregate of high-melting point sinterable constituents substantially free of fines, with a slip containing alumina gel. Such a slip can be prepared by acid attack of a fine alumina powder to provide a composition of a pH value suitable to cause a gel of activated alumina to precipitate therefrom. The mix is then molded and fired preferably in a blast of oxidizing gas as earlier described. In this modification of the invention, powder metal may, or may not, be added to the mix.

It will be appreciated that a main aspect of the invention lies in the creation of hot points distributed within the mass of the porous refractory element being fired through oxidation of particles of oxidizable powder incorporated therein by channeling the oxidizing gas through orifices in the compact mass surrounding the porous element on at least three sides and thence into the interior portion of the porous element. The creation of these hot points during firing ensures that the element is "soaked" through, regardless of its thickness dimensions, at a temperature high enough to sinter the refractory aggregate constituent at least at the grain surfaces of the aggregate (i.e. without or with liquid-phase sintering or fusing of the grains). In this way it becomes feasible to use aggregates having considerably higher sintering temperatures than would be the case in the absence of the formation of the hot points of the invention, and thereby to provide porous refractory end products of considerably higher a degree of refractoriness than any that could be heretofore produced. Also, and most importantly, porous refractory elements of larger thickness dimension can effectively be produced by channeling the oxidizing gas.

The following are illustrative of the invention and are presently preferred embodiments.

Example 1

This example is directed to the production of refractory concrete for use in channeling a blast of gaseous reagent into and through a bath of molten metal. For this purpose, the element has a porous interior zone which communicates at one end of the element with one or more gas-inlet holes, and which presents at the opposite end of the element a porous surface through which the gas is to be discharged. The side walls of the element around the porous zone are compact.

To provide an element of this character, including the compact side walls, two different refractory concrete mixes are used, one of them porous and the other non-porous. The two mixes are cast by a known technique to be described below in such a manner that the hydraulic setting of both mixes will occur substantially simultaneously, whereby the resulting composite element will exhibit over-all mechanical characteristics similar to those of an integral, monolithic element.

The porous mix is as follows:

| | Percent |
|---|---|
| Aggregate (magnesia and/or chrome magnesia): | |
| Granulometry— | |
| 0–0.5 mm. | 0 |
| 0.5–1.0 mm. | 29 |
| 1.0–2.0 mm. | 45 |
| Hydraulic binder (lime aluminate): | |
| $Al_2O_3$, 70% | 11.5 |
| CaO, 28% | 4.5 |
| Impurities, 2% | 0.5 |
| Powder metal (in this case an oxide-metal mix) | 1.5 |
| $Al_2O_3$ _____ 50% | |
| Cr _____ 50% | |
| Constituent water | 8 |
| | 100 |

The compact mix has the following exemplary composition:

| | Percent |
|---|---|
| Aggregate [calcined alumina silicate ($Al_2O_3 \cdot SiO_2$ containing 42% $Al_2O_3$)]: | |
| Granulometry— | |
| 0–0.2 mm. | 27 |
| 0.2–0.5 mm. | 17 |
| 0.5–1.0 mm. | 12 |
| Hydraulic binder (lime aluminate): | |
| $Al_2O_3$, 40% | 10.5 |
| CaO, 40% | 10.5 |
| $SiO_2$, 10% | 3.0 |
| $Fe_2O_3$, 10% | 3.0 |
| Constituent water | 17 |
| | 100 |

It is understood that the above compact mix does not contain oxidizable powder metal constituent according to the invention, which constituent is present only in the porous refractory concrete composition.

The two mixes are prepared separately and simultaneously, and are then cast in a special mold comprising a separable liner. The non-porous concrete mix is poured into the space between the mold wall and the liner up to a predetermined level, so as to provide, in the finished molding, the desired non-porous casing or sheath. The liner is then gradually raised while the interior of the mold is filled at a corresponding rate with the porous refractory concrete mix. Energetic tamping is applied throughout the filling operation. Finally a further amount of the non-porous mix is poured into the top of the mold space, around one or more suitable cores to provide for the gas-inlet passages.

When the above procedure, or an equivalent one, is used, the two concrete mixes will set substantially simultaneously to provide the desired unitary monolithic element. The molding is removed and immersed 24 hours in water to promote the final setting of the hydraulic binder while preventing evaporation.

The firing step may proceed immediately on removal of the molding from the water bath, but should in that case include an initial stage in which the part is heated gradually to permit a progressive discharge of the excess water. This initial heating stage may involve a dwell at about 400° C., for a time depending on the size of the molding, e.g. about one hour in the case of a molding about 10 cubic decimeters in volume, and as little as a few minutes for small parts.

This initial stage of the firing cycle is followed by a more rapid heating rate until the sintering temperature is reached, i.e. 1450° C., for the indicated composition. Simultaneously, an oxidizing gas, which may be pure oxygen, is delivered in a channelled stream directed into the porous interior of the element. In order to accomplish this, the furnace is provided with an inlet pipe extending through a furnace wall and connected at its outer end with a source of oxidizing gas under pressure and at its inner end, through a suitable sealing joint, to the gas-inlet passage or passages of the element. The oxidizing blast is maintained for about thirty minutes at the sintering temperature, in the case of a part 10 dm.³ in volume. The total firing time and the duration of the dwell at sintering temperature are both substantially proportional to the volume of the part. The Cr particles dispersed throughout the molding are oxidized, creating a multiplicity of hot points which ensure that the sintering temperature is effectively and positively attained in all areas of the molding. No special precautions need be taken for cooling the molding, which may simply be removed from the furnace on completion of the above described heating cycle.

*Example 2*

In order to produce shaped refractory concrete blocks which are porous as in Example 1, but useful for moderately high temperature duty, the following porous mix is prepared:

|  | Percent |
|---|---|
| Aggregate [calcined alumina silicate ($Al_2O_3SiO_2$ containing 42% $Al_2O_3$)]: |  |
| Granulometry— |  |
| 0–0.5 mm. | 0 |
| 0.5–1.0 mm. | 30 |
| 1.0–2.0 mm. | 35 |
| Hydraulic binder (lime aluminate): |  |
| $Al_2O_3$ 40% | 8 |
| CaO 40% | 8 |
| $SiO_2$ 10% | 2 |
| $Fe_2O_3$ 10% | 2 |
| 100% |  |
| Powder metal (ferro-silicon powder): | 2 |
| Si 75% |  |
| Fe 25% |  |
| 100% |  |
| Constituent water | 13 |
|  | 100 |

The compact mix is similar to that set forth in Example 1.

The two mixes are formed and treated in a manner exactly as that described in Example 1, except the final firing temperature is 1150° C. instead of 1450° C.

*Example 3*

A porous refractory element according to the invention is produced by molding a mixture of alumina slip, aluminous clay, and powder metal, and firing the molding in a stream of oxidizing gas. The alumina slip is obtained by reacting fine alumina powder with acid to provide a suitable pH value and to obtain a precipitation of activated alumina gel. The aluminous clay comprises white corundum $Al_2O_3$, free of fines less than 0.5 mm. in size. The following composition for the mix has given excellent results.

|  | Percent |
|---|---|
| Alumina slip | 24 |
| White corundum, $Al_2O_3$ | 74 |
| Granulometry: |  |
| 0–0.5 mm. | 0% |
| 0.5–1.0 mm. | 65% |
| 1.0–2.0 mm. | 35% |
| Ferro-silicon powder | 2 |
| Si | 75% |
| Fe | 25% |
|  | 100 |

The mixture is thoroughly homogenized, and molded together with the compact mix described in Example 1 in a metal mold of the desired shape, manually or with a press. Vibration should preferably be avoided during molding. Before stripping the element from the mold, it is placed in an oven and gently heated to a temperature not higher than about 150° C. for a time depending on the size of the element, e.g. about 46 hours in the case of a molding 40 to 50 kilograms in weight. The molded part is allowed to cool and removed from the mold. The molding is placed in a furnace and gradually heated, at a rate of temperature increase on the order of 100° C. per hour, to a final temperature in the range 1200–1300° C., and is held at this temperature a time depending on the size of the part, e.g. 24 hours for a part about 50 kg. in weight. During the dwell of the molding at this final temperature a stream of oxidizing gas, in a channelled stream is directed into the porous interior of the element for at least 30 minutes.

Having thus disclosed the invention what is claimed is:

1. A process for the production of a refractory structure which comprises preparing a porous homogeneous admixture (A) by homogeneously admixing (1) an aggregate of refractory material of a particle size ranging from about 0.3 mm. to about 2.0 mm. and having a sintering temperature of at least about 1150° C., (2) refractory ceramic binder which maintains the particles of the mix in coherent state below said temperature, and (3) an oxidizable metal powder uniformly distributed throughout said mix, preparing a non-porous admixture (B) by homogeneously admixing (1) an aggregate refractory material, at least 20% by weight of said material being less than about 0.2 mm. with the remainder of said refractory material having a particle size of 0.2 mm. to about 1 mm., and (2) a refractory ceramic binder which maintains the particles of the mix in coherent state, casting admixture A into a shaped porous structure, and, substantially simultaneously, casting admixture B to provide rigid wall surrounding A on between three to five sides and, providing at least one orifice in one of the rigid walls opposite to the side of A which is not covered by B, subjecting the shaped article to heating below said sintering temperature but sufficient to set said binder, and then firing the structure in a firing zone at said sintering temperature while blowing a stream of oxidizing gas from a source remote from said zone through said orifice and thence into the interior of the porous structure, whereby said metal powder throughout the porous structure is oxidized, thereby creating a multiplicity of point heat-sources throughout the porous structure and ensuring that particles of sinterable aggregate throughout said porous structure are effectively sintered.

2. A method according to claim 1, wherein the metal powder constituent is constituted by a member selected from the group consisting of powdered zirconium, aluminum, chromium, iron and ferro-silicon.

3. A method according to claim 1, wherein the metal powder constituent is admixed with metal oxide.

4. A method according to claim 1, wherein the oxidizable metal powder is selected from the group consisting of zirconium, aluminum and chromium, whereby the blowing of the oxidizing gas produces a shallow sintering effect on the particles of the aggregate by the superficial heating resulting from the oxidation of the metal powder.

5. A method according to claim 1, wherein said metal powder is oxidized to oxide which combines with said aggregate constituent to lower the melting point thereof, so that the blowing of said oxidizing gas produces a sintering effect in liquid phase of the aggregate particles throughout said porous structure.

6. A method according to claim 1, wherein said metal powder is selected from the group consisting of powdered iron and ferro-silicon.

References Cited by the Examiner

UNITED STATES PATENTS

| | | |
|---|---|---|
| 1,660,745 | 2/1928 | Delaney. |
| 1,709,035 | 4/1929 | Payne. |
| 1,823,356 | 9/1931 | Frink. |
| 1,982,490 | 11/1934 | Williams. |
| 2,042,870 | 6/1936 | Stafford. |
| 2,637,890 | 5/1953 | Ramsay _____ 264—60 |
| 2,741,822 | 4/1956 | Udy _____ 264—60 |
| 2,943,008 | 6/1960 | Saunders _____ 264—112 |

ROBERT F. WHITE, *Primary Examiner.*

R. B. MOFFITT, *Assistant Examiner.*